(12) United States Patent
Chio

(10) Patent No.: US 7,926,462 B2
(45) Date of Patent: Apr. 19, 2011

(54) KINETIC ENERGY GENERATION DEVICE

(76) Inventor: Chuy-Nan Chio, Taipei (TW)

( * ) Notice: Subject to any disclaimer, the term of this patent is extended or adjusted under 35 U.S.C. 154(b) by 749 days.

(21) Appl. No.: 11/994,493

(22) PCT Filed: Jul. 7, 2005

(86) PCT No.: PCT/CN2005/000992
§ 371 (c)(1),
(2), (4) Date: Jan. 2, 2008

(87) PCT Pub. No.: WO2007/006170
PCT Pub. Date: Jan. 18, 2007

(65) Prior Publication Data
US 2008/0210026 A1 Sep. 4, 2008

(51) Int. Cl.
*F02B 75/32* (2006.01)
(52) U.S. Cl. .................................. 123/197.1; 74/52
(58) Field of Classification Search ............... 123/197.1, 123/197.4; 74/52
See application file for complete search history.

(56) References Cited

U.S. PATENT DOCUMENTS
4,966,043 A 10/1990 Frey
5,158,047 A 10/1992 Schaal et al.

FOREIGN PATENT DOCUMENTS
CN 1116685 2/1996
JP 6026359 2/1994
JP 7063066 3/1995

OTHER PUBLICATIONS
PCT/CN2005/000992 International Search Report dated Mar. 15, 2006.

*Primary Examiner* — Noah Kamen
(74) *Attorney, Agent, or Firm* — Schmeiser, Olsen & Watts LLP

(57) ABSTRACT

A kinetic energy generation device comprises a case having a fixation gear wheel disposed at an interior rim thereof and engaged with a movable gear wheel. A motion transmission member is installed in the case, and a motion transmission shaft is provided at the axis of the motion transmission member. An axis gear wheel is disposed in relation to the movable gear wheel so that the axis gear heel is engaged with the motion transmission shaft. External to the axis gear wheel, a flywheel is engaged therewith and revolved in synchronization with the movable gear wheel. A force applying shaft is provided at an end of the flywheel. Each of several links Is connected to the force applying shaft with its one end and to a cylinder piston with the other end thereof.

8 Claims, 14 Drawing Sheets

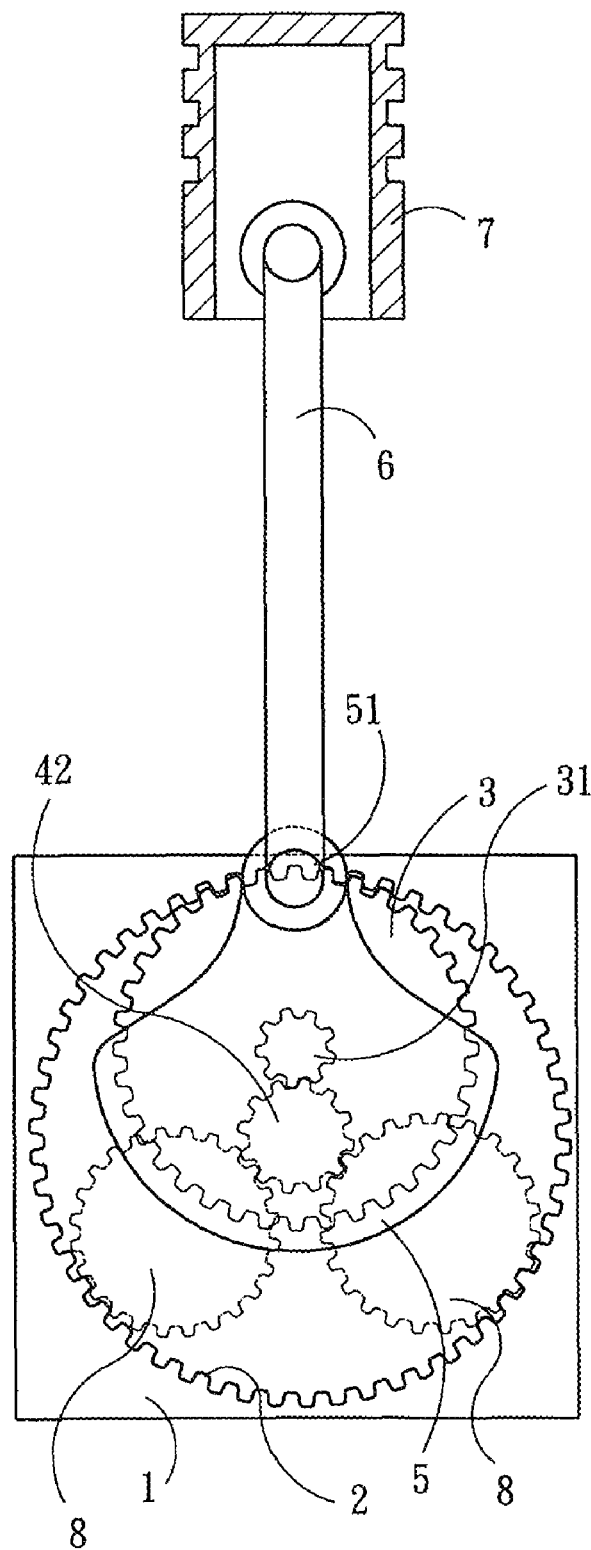
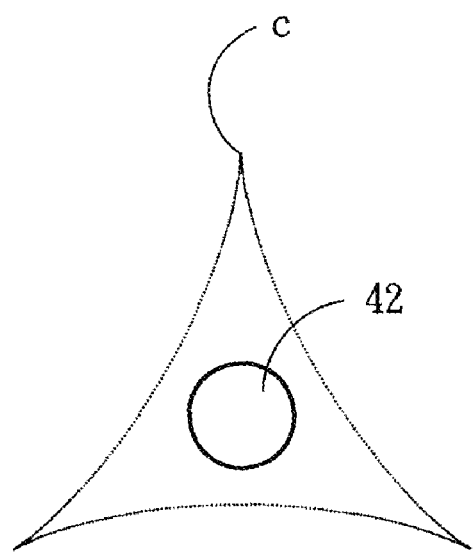
FIG. 13
FIG. 14

US 7,926,462 B2

KINETIC ENERGY GENERATION DEVICE

BACKGROUND OF THE INVENTION

1. Field of the Invention

The present invention relates to a kinetic energy generation device, and in particular, to a kinetic energy generation device which can reduce side component of force so as to improve the output power with high torque but low rotational speed and reduced vibration.

2. Description of the Prior Art

The operation mode of a traditional engine is shown in FIG. 18. As the fuel in the cylinder burns, a piston X1 pushes a crank shaft X2 which in turn drives a transmission shaft X3 to rotate thereby the output power is generated. As for the crank shaft X2, it produces a relatively large side component of force due to a rather large side pressure angle it forms with the direction of moving thereby resulting in an over all loss of the kinetic energy. In addition when a conventional engine piston comes to a dead point, the inertia force at a force applying point X4 and the force of the transmission shaft X3 counteracts each other resulting in not only producing loss of kinetic energy but also causing vibration that leading to shortening the lifespan of the engine or even causing failure of the engine.

Furthermore, a traditional engine must go through four strokes of suction, compression, power and exhaust sequentially. During the cycle the crank shaft has already rotated twice about the output shaft, namely, the engine is rotated twice for output in each combustion stroke so that the output torque is low. Therefore the rotational speed of the engine has to be increased, or the cylinder volume is to be expanded so as to provide a larger torque for the engine to operate.

There are a lot of contrivances for improving the engine performance. One of them disclosed by the U.S. Pat. No. 4,044,629 is shown in FIG. 19. In this case a crank shaft 5 is engaged to an eccentric wheel 8 which being involved in an external gear 7. When the external gear 7 rotates together with a mated internal gear 15, the force applying direction of an axis 6 can be calibrated by the eccentric wheel 8 so that improving the engine efficiency. Another case disclosed by the U.S. Pat. No. 4,073,196 is shown in FIG. 20. In this case a crank shaft 26 is connected to an external gear 43a via a cantilever 40a to revolve about an internal gear 44, and then employing an axis 37 of the external gear 43a to transmit the kinetic energy. By so the engine efficiency can be improved by adjusting force applying direction of the axis 37 with the cantilever 40a.

Anyway only relying on the above two contrivances can not be able to thoroughly solve the problems of the loss due to the side pressure and unstable vibration inherent to a traditional engine. The engine still has to rotate twice for output in each explosion stroke so that the volume of the engine can not be minimized, and the output torque is still low.

Except the engine, an air compressor is also a kinetic energy generation device. FIG. 21 shows a contrivance disclosed by Taiwan Pat. No. 95101281.9, in this case an engine has a structure to cease working the piston tentatively when it has finished one round of up and down motion. Its operation view is shown in FIG. 22. An internal gear 3 is disposed at an interior rim of a case cover 5. The internal gear 3 is engaged with an external gear 2 which is further connected to a sub-bent shaft 1. One end of the sub-bent shaft 1 is connected with a piston and a link, whereas the external gear 2 outputs the kinetic energy with a lower shaft 12 attached to a main bent shaft 4. By means of the mutual compensation of the rotating internal gear 3 and external gear 2, the engine is able to rest once when the piston and the link 6 make one round of up and down so as to increase energy storage during intaking fuel. Besides, the action of the piston and link 6 will never produce the side component of force as that happens to the traditional crank shaft.

The aforesaid structure of an air compressor stores energy by increasing the air pressure. The air compressor performs storing energy by increasing air pressure once every twice rotation of the compressor with a poor efficiency.

SUMMARY OF THE INVENTION

It is an object of the present invention to provide a kinetic energy generation device which can output higher power and torque with a low engine rotational speed through frequent combustion strokes.

It is another object of the present invention to provide a kinetic energy generation device which can output higher power through reducing variation of inertia angle of the force applying shaft and alleviating mechanical vibration.

It is one more object of the present invention to provide a kinetic energy generation device which can operate stably with less vibration thereby prolonging the lifespan of the device.

To achieve the aforesaid objects, the present invention provides a kinetic energy generation device comprising a case having a fixation gear wheel disposed at an interior rim thereof and engaged with a movable gear wheel. The gear ratio of the fixation gear wheel to the movable gear wheel is 3:2. A motion transmission member is installed in the case with a ball bearing interposed between the contact surface of the case and the motion transmission member. A motion transmission shaft is provided at the axis of the motion transmission member. An axis gear wheel is disposed in relation to the movable gear wheel so that the axis gear wheel is engaged with the motion transmission shaft. The gear ratio of the motion transmission shaft to the axis gear wheel is also 3:2. External to the axis gear wheel, a flywheel is engaged therewith and revolved in synchronization with the movable gear wheel. A force applying shaft is provided at an end of the flywheel. Each of several links is connected to the force applying shaft with its one end and to a piston of a cylinder with the other end thereof. The cylinder, piston, and links are disposed with the multiple of three, and the links are 120° apart from each other.

When the piston exerts a pressure on the force applying shaft through the link, the flywheel and the movable gear wheel revolve about the axis gear wheel and the motion transmission shaft is caused to revolve by the axis gear wheel, whereby power is outputted by the motion transmission shaft. The device of the present invention is able to output higher power with a comparatively low rotational speed through frequent combustion strokes thereby achieving a mechanical structure of low speed and large torque, and also by reducing variation of inertia angle of the force applying shaft and alleviation mechanical vibration so as to minimize loss of componential force and increase the power output.

BRIEF DESCRIPTION OF THE DRAWINGS

FIG. 13 is a front view in one more embodiment of the present.

FIG. 14 is a locus of motion in one more embodiment of the present invention.

Figures 1, 2:
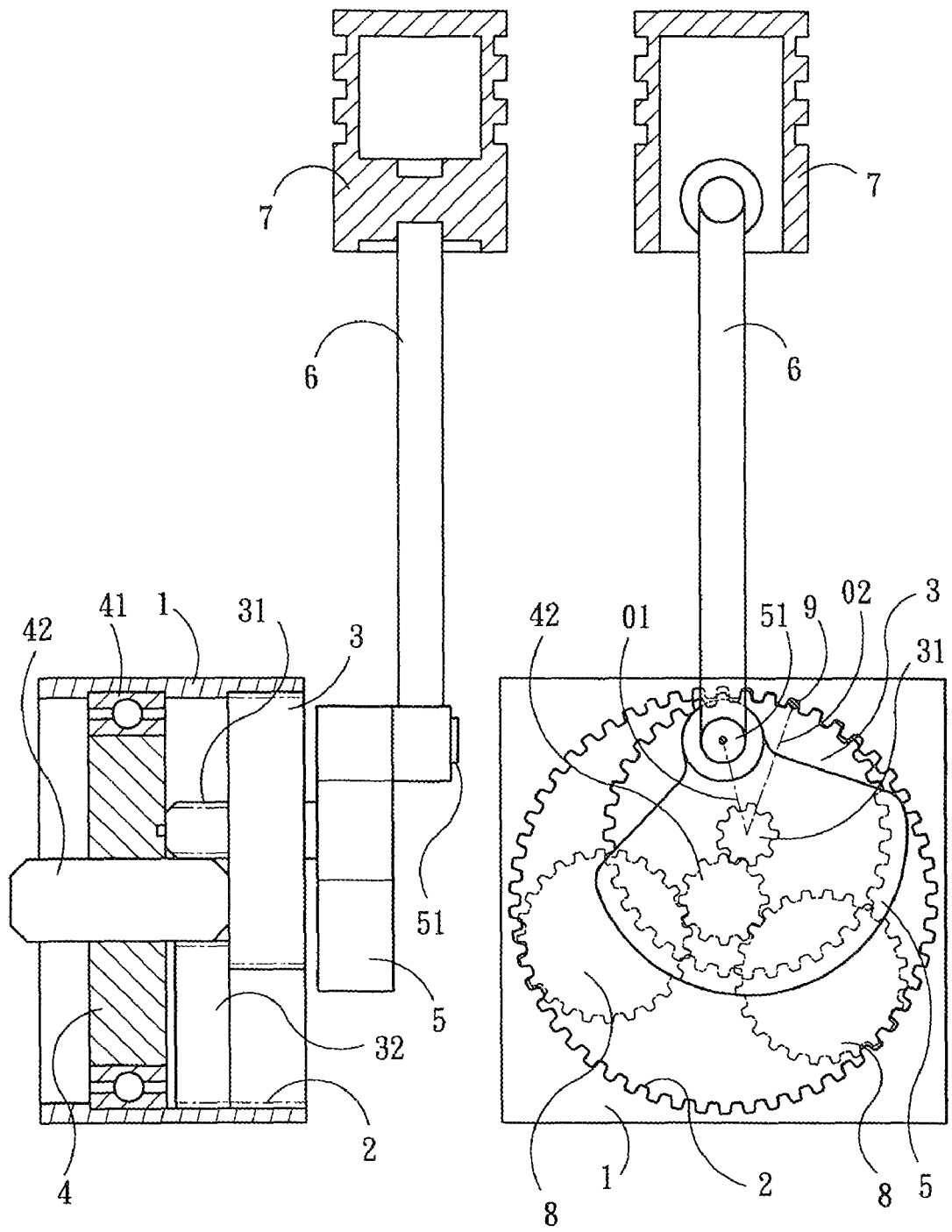
FIG. 1 is a side view of the present invention.
FIG. 2 is a front view of the present invention.
Figures 3, 4:
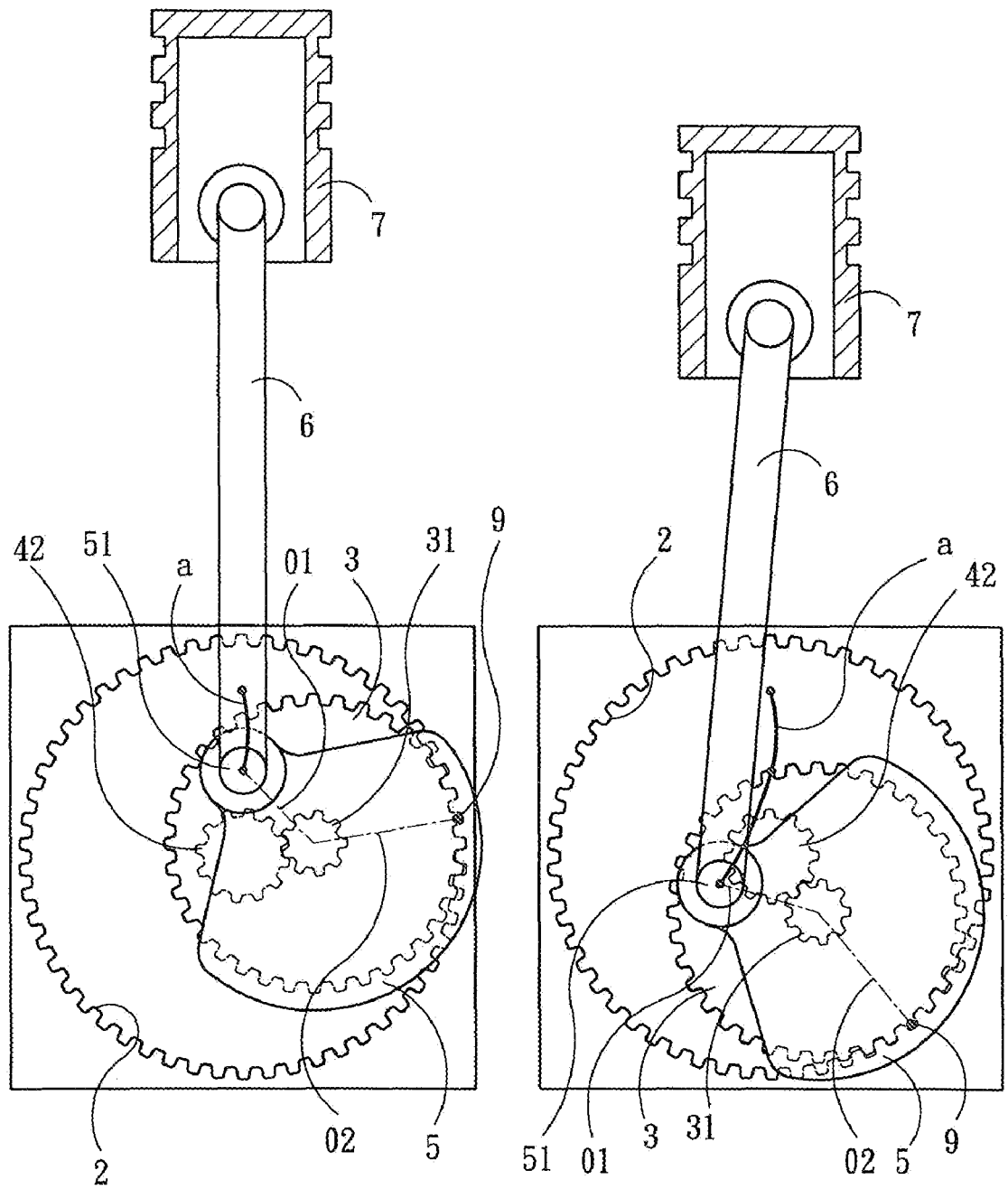
FIG. 3 through FIG. 9 are schematic views illustrating the operation (1) to (7) according to the present invention respectively.
Figure 5:
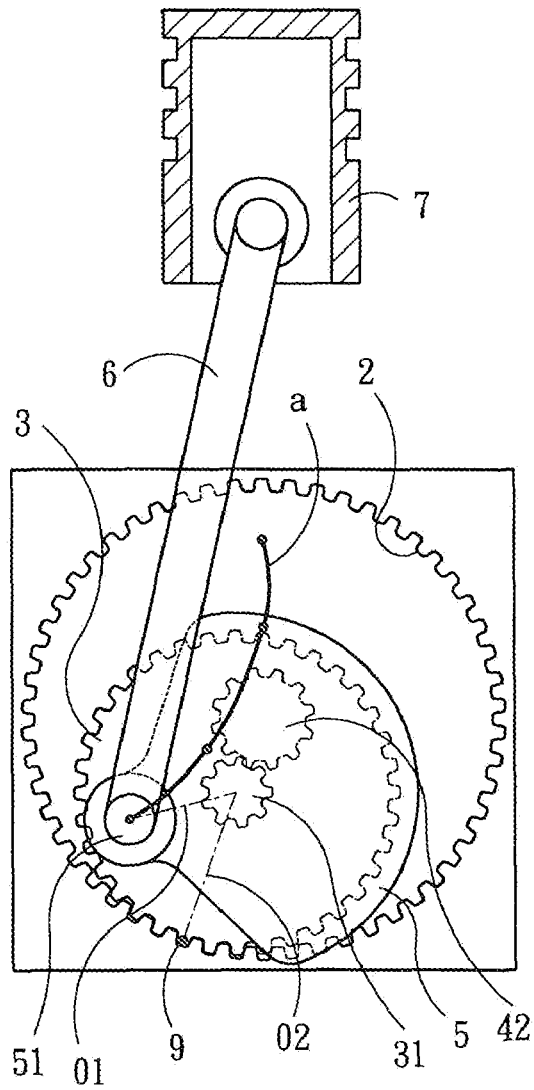
Figure 6:
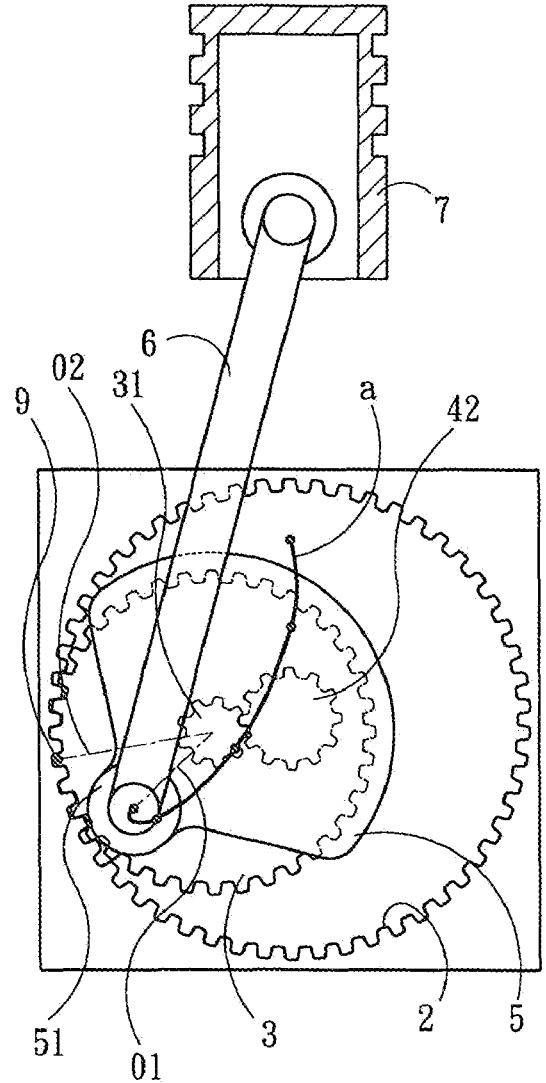

SYMBOLIC NUMERALS IN DRAWINGS 01,02: force applying line 1: case 2: fixation gear wheel 3: movable gear wheel 31: axis gear wheel 4: motion transmission member 41: ball bearing 42: motion transmission shaft 5: flywheel 51: force applying shaft 6: link 7: piston 8: follower gear 9: mating point a,b,c: locus of motion s,t: locus zone X1: piston X2: crank shaft X3: transmission shaft X4: force applying point

DETAILED DESCRIPTION OF THE PREFERRED EMBODIMENT

Referring to FIGS. 1 and 2, The kinetic energy generation device according to the present invention essentially comprises a case 1, a fixation gear wheel 2, a movable gear wheel 3, a motion transmission member 4, a flywheel 5 and several links 6.

The fixation gear wheel 2 is disposed at an interior rim of the case 1 and engaged with the movable gear wheel 3 to allow the latter to rotate on the former. The gear ratio of the fixation gear wheel 2 to the movable gear wheel 3 is 3:2. The motion transmission member 4 is installed in the case 1 to output the kinetic energy. A ball bearing 41 is provided between the contact surface between the motion transmission member 4 and the case 1 so as to smoothen the rotational contact therebetween. A motion transmission shaft 42 is provided at the center of axis of the motion transmission member 4. An axis gear wheel 31 is disposed in relation to the movable gear wheel 3 so that the axis gear wheel 31 is engaged with the motion transmission shaft 42. The gear ratio of the motion transmission shaft 42 to the axis gear wheel 31 is also 3:2. External to the axis gear wheel 31, the flywheel is engaged therewith and revolved in synchronization with the movable gear wheel 3. A force applying shaft 51 is provided at one end of the flywheel 5. Each of the links 6 is connected to the force applying shaft 51 with its one end and to a piston 7 of an cylinder (not shown) with the other end thereof so as to allow the piston 7 able to reciprocate along the wall of the cylinder thereby driving the flywheel 5 and the movable gear wheel 3 to rotate with the links 6 and perform transmission of the kinetic energy.

With this scheme the piston 7 driven by the kinetic energy produced by the fuel combustion in the cylinder exerts a pressure on the force applying shaft 51 through the links 6 so as to rotate the flywheel 5 and the movable gear wheel 3 about the axis gear wheel 31 and revolve around the fixation gear wheel 2, whereas the axis gear wheel 31 drives the motion transmission shaft 42 to rotate to output the kinetic energy. In order to keep stable operation of the motion transmission shaft 42, several follower gear wheels 8 may be interposed in a dummy area between the motion transmission shaft 42 and the fixation gear wheel 2 to stably operate as if planet gear wheels.

The present invention is characterized in that it comprised three kernels of the axis gear wheel 31, the force applying shaft 51, and the mating point 9 where the fixation gear wheel 2 and the movable gear wheel 3 engage with each other. When the kinetic energy produced by the fuel combustion in the cylinder exerts a pressure on the force applying shaft 51 through the links 6, its force of inertia exerts a pressure from the force applying shaft 51 in the direction (force applying line 01) towards the axis gear wheel 31, and the reverse force is exerted from the mating point 9 in the direction (force applying line 02) towards the axis gear wheel 31 so that the force outputted from the axis gear wheel 31 to the motion transmission shaft 42 is far great than the force produced by any conventional structure. Moreover, the power loss is less since the power is outputted by direct engagement of the axis gear wheel 31 with the motion transmission shaft 42. An angle is preferably formed between the two force applying lines 01 and 02 to enhance the force by the principle of lever so as to avoid mutual counteract of force. As shown in FIG. 2, when the piston 7 is at the initial point of the stroke, the axis gear wheel 31 is shifted an angle so as to facilitate the links 6 to drive the movable gear wheel 3 and the flywheel 5.

Besides, in the present invention the links 6 maintain a very small variation of their side pressure angle such that most of the force of inertia is utilized as the power to drive the movable gear wheel 3 and the flywheel 5 so as to reduce ineffective side component of force. As shown in FIG. 2 through FIG. 9 when the movable gear wheel 3 revolves around the fixation gear wheel 2, the movable gear wheel 3 and the flywheel 5 revolve in the opposite direction to form a locus (a) of the force applying shaft 51 shown in FIG. 10.

Figures 7, 8:
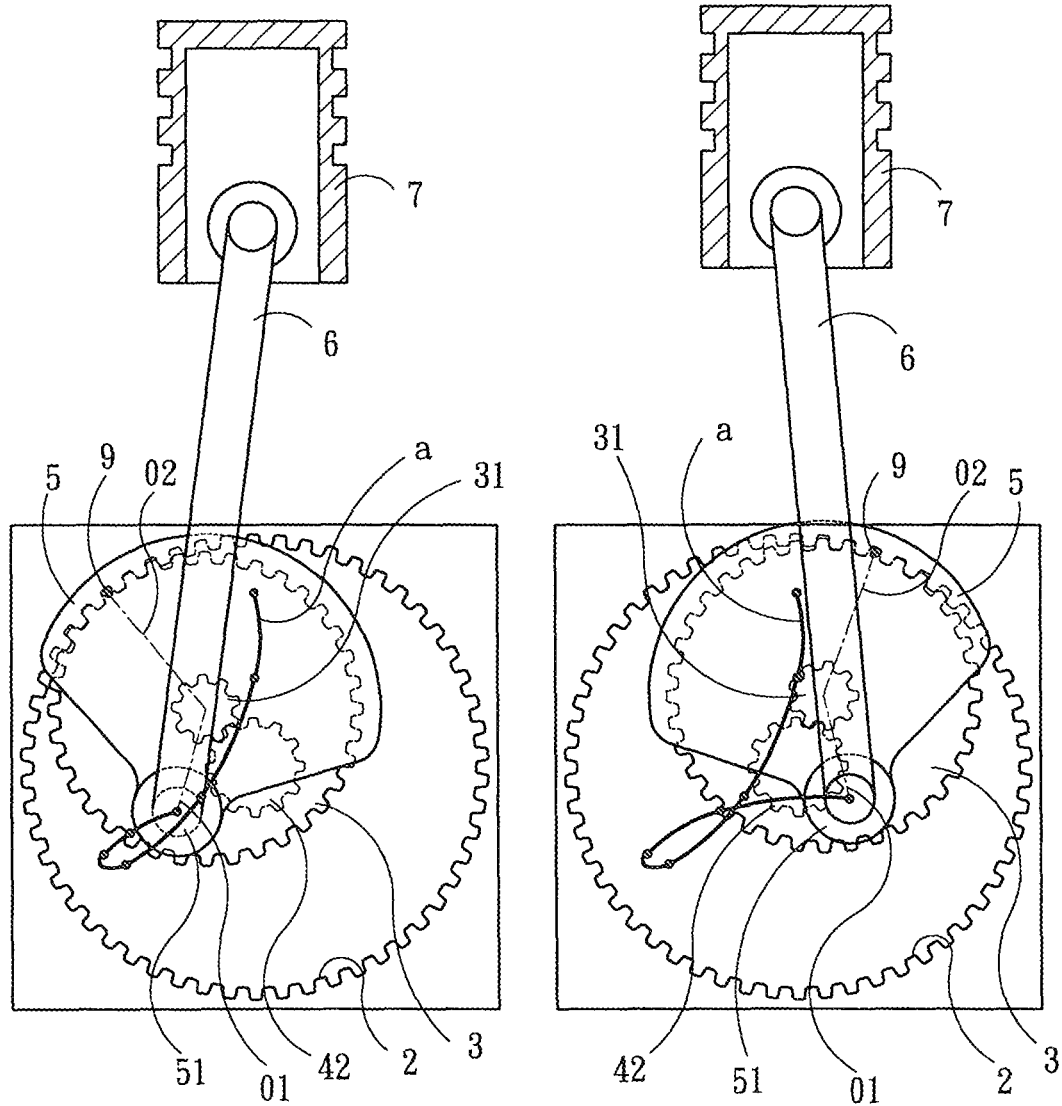
Figure 9:
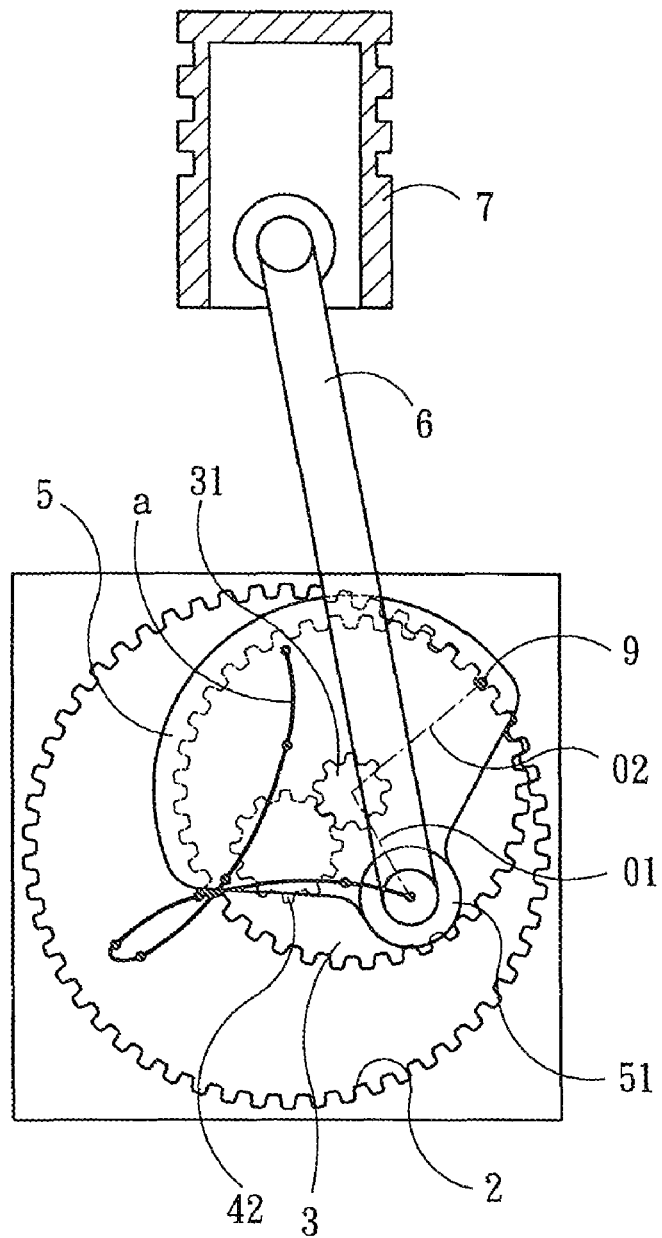

With the aforesaid locus (a), in the present invention three cylinders are included in one set, three motion transmission shafts 42 are disposed radially apart 120° from each other serving for three cylinders such that each cylinder supplies one-third of the total output. When the fist cylinder begins its combustion stroke, the locus of motion traced by the piston 7 during one cycle (up to down) is the locus (a) described in FIG. 2 to FIG. 4. this process of increasing pressure produces a locus zone S of increasing pressure shown in FIG. 10 which being approximately linear so that most portion of the force from the link 6 is applied to the movable gear wheel 3 for rotation with less loss of side componential force. As soon as the piston 7 has reached near the end of the stroke and slowed down. It traces a locus (a) described in FIG. 5 and FIG. 6, then the link 6 goes to the second cylinder for compression. The state of combustion stroke in the second cylinder is shown in FIG. 7 to FIG. 9, then follows the compression stroke in the third cylinder. At the same time the first cylinder beings its exhaust stroke. In this manner when the piston 7 produced the maximum force of inertia, most portion of its is applied to the movable gear wheel 3 for rotation thereby greatly increasing the output of the kinetic energy.

Meanwhile, in a conventional engine, four strokes of suction, compression, combustion and exhaust are included in one complete cycle, that is to say, only ½ of explosion force can be utilized in one revolution of the engine. Hence the rotational speed of the engine must be kept high to output a sufficient torque. On the contrary, in the present invention three cylinders are disposed in one set such that each cylinder needs to rotate only 120° for one time of explosion because there are three cylinders to take care of power output work in sequence. Therefore the device of the present invention is able to develop a large output power, strong torque with less power loss.

Figure 10:
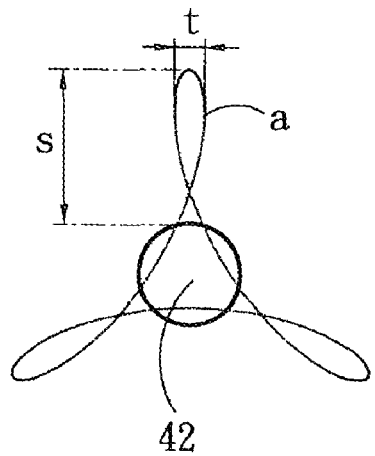
FIG. 10 is a locus of motion of the present invention.
Figure 11:
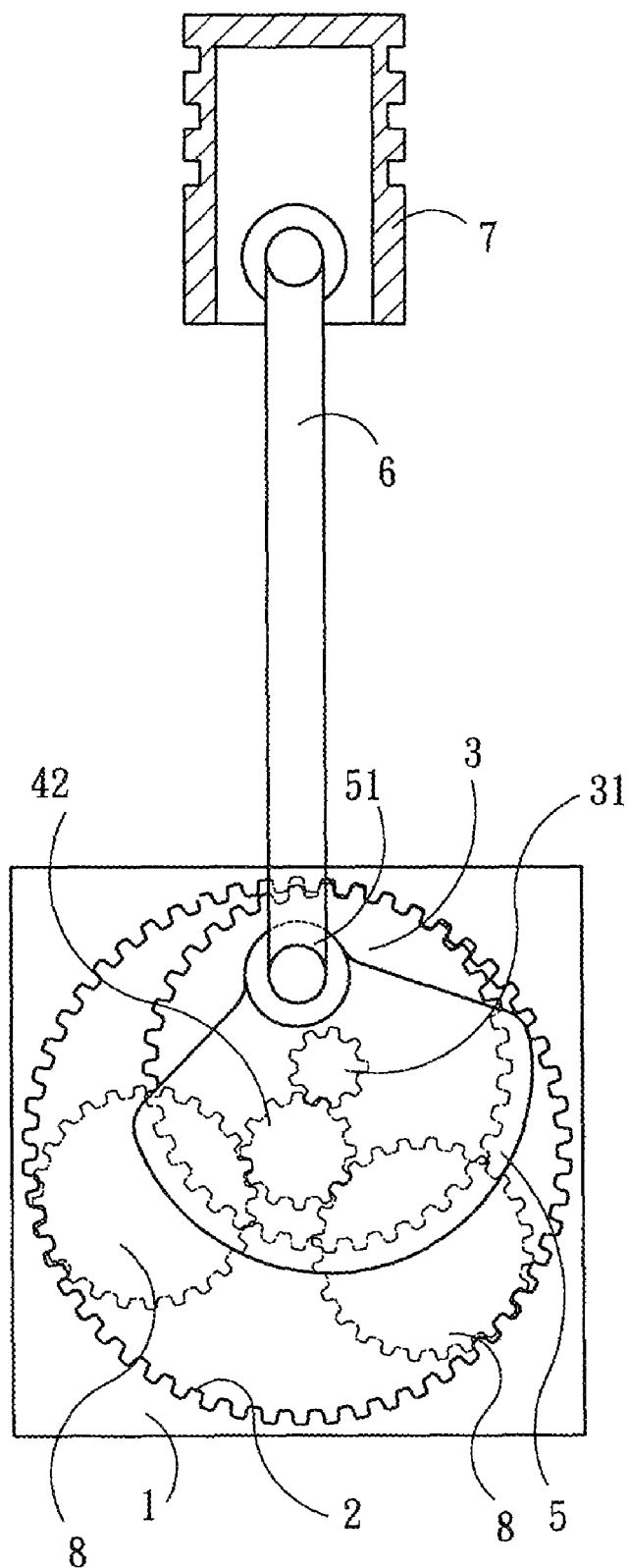
FIG. 11 is a front view in another embodiment of the present invention.
Figure 12:
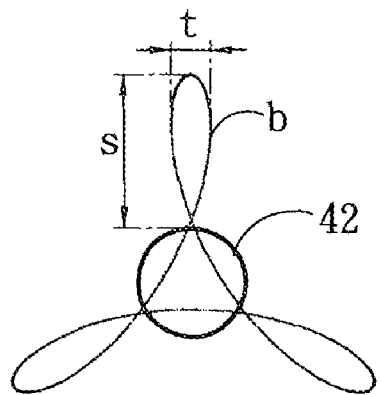
FIG. 12 is a locus of motion in another embodiment of the present invention shown in FIG. 11.

The height of the aforesaid force applying shaft 51 can be adjusted according to the actual need. If it is to be essentially used for an engine, the shaft 51 can be brought to a position near to the mating point 9 so as to trace a locus (a) as shown in FIG. 10. As its pressure increasing, locus zone S is longer to be able to provide a stronger force with a narrower offset locus zone t so as to minimize the loss of said componential force. As shown in FIG. 11, if the shaft 51 is lowered, the locus (b) is formed as shown in FIG. 12 to have a shorter compressive stroke locus zone S. In this case the linear push force will be weaker to have a broader shifted locus zone (t). As a result, part of the power of the piston 7 imparted by the link 6 becomes the loss of side componential force that degrades the efficiency of the engine because of its improper structure.

Meanwhile, except applying to an engine, the kinetic energy generation device of the present invention can be employed in another application such as for an air compressor as shown in FIG. 13. In this case the motion transmission shaft 42 is driven by another prime mover to rotate, the power is then transmitted to the piston 7 via the axis gear wheel 31, the movable gear wheel 3 the flywheel 5, the force applying shaft 51 and the links 6 to compress the cylinder to store energy. As shown in FIG. 14, a locus line (c) is formed by adjusting higher the height of the force applying shaft 51 so as to allow the kinetic energy to feedback to the piston 7 for compression and then outputting. In the present invention, the number of cylinders is designed to be multiple of three whereas the stability will be degraded to cause vibration should the number of cylinder be reduced. The scheme of the present invention is also applicable to the structure for the massage chair.

Figure 15:
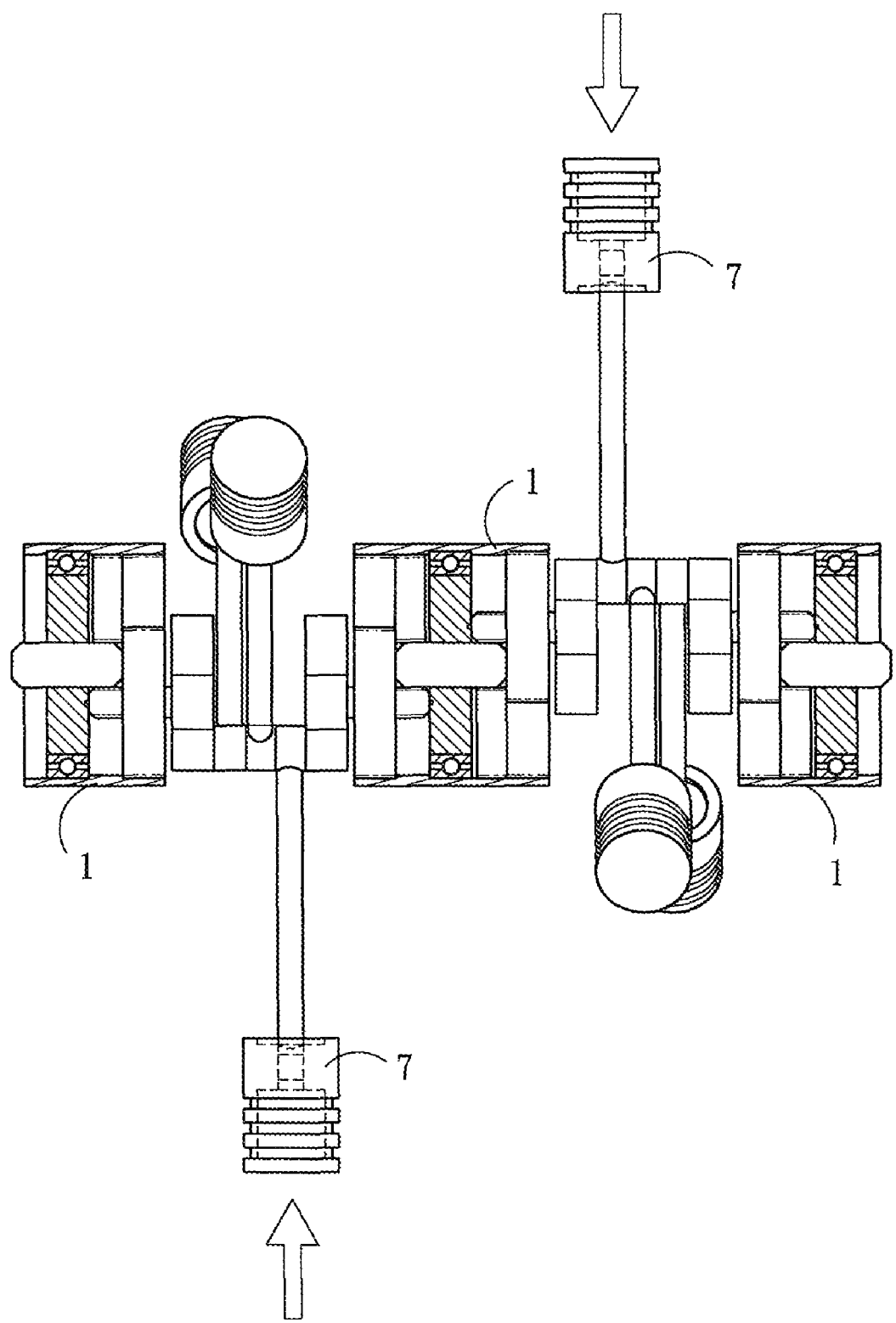
FIG. 15 is a side view of a six-cylinder device of the present invention.
Figure 16:
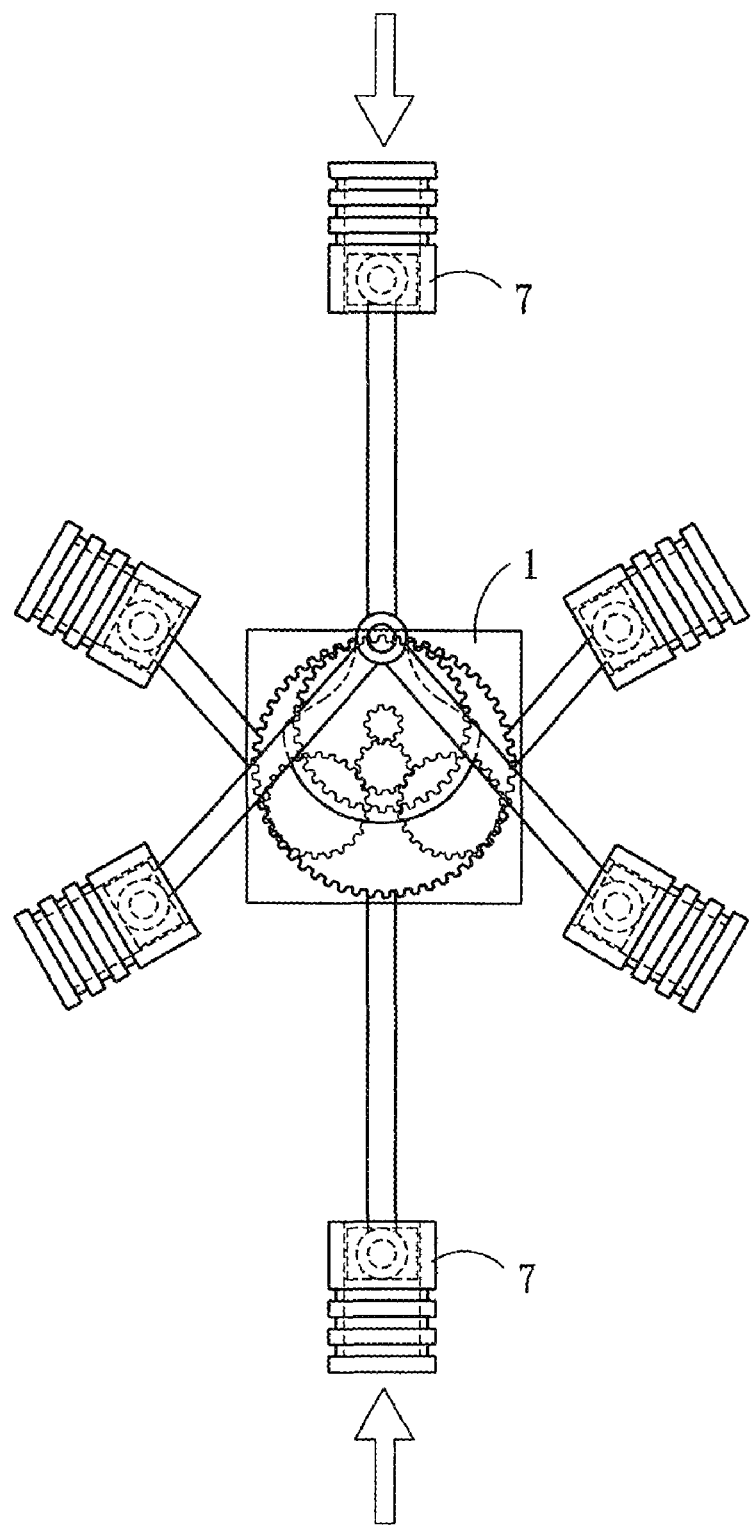
FIG. 16 is a front view of a six-cylinder device of the present invention.
Figure 17:
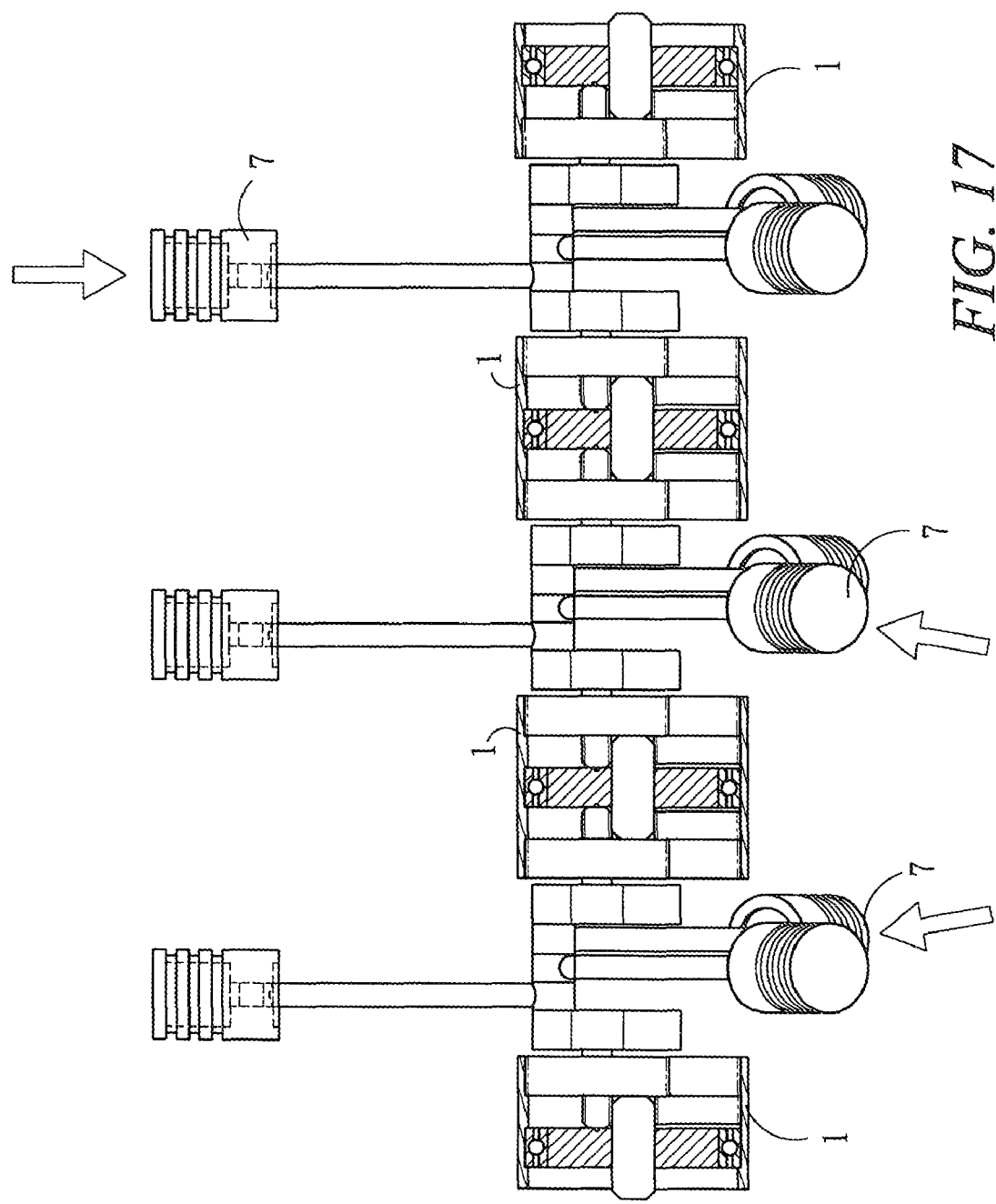
FIG. 17 is a side view of a nine-cylinder device of the present invention.
Figure 18:
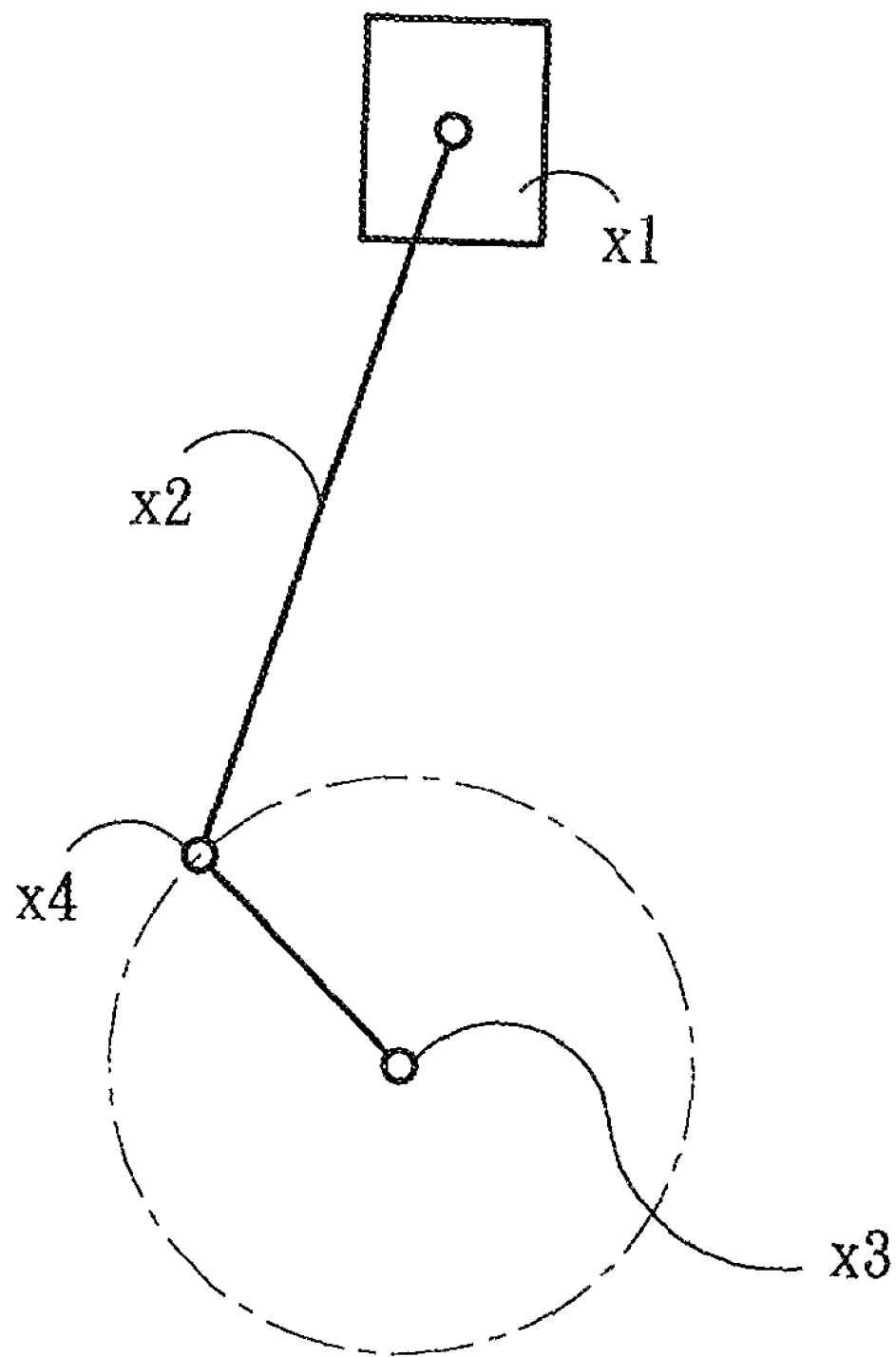
FIG. 18 is a schematic view illustrating the operation of the crank shaft in a conventional cylinder.
Figure 19:
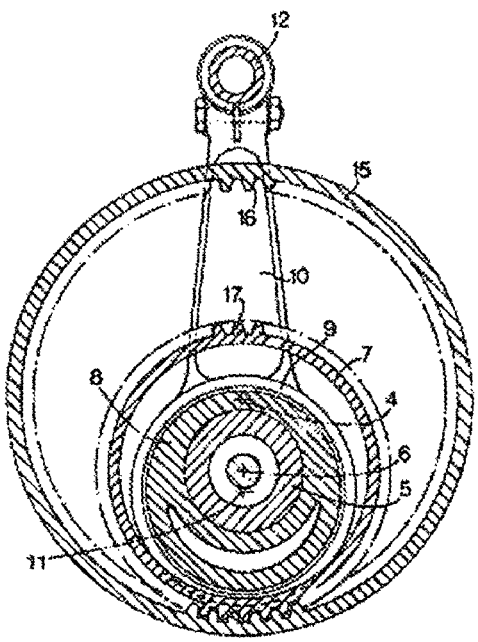
FIG. 19 is a schematic view of the engine disclosed in U.S. Pat. No. 4,044,629.
Figure 20:
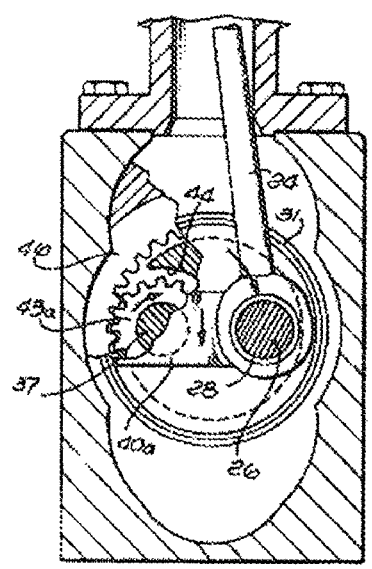
FIG. 20 is a schematic view of the engine disclosed in U.S. Pat. No. 4,073,196.
Figure 21:
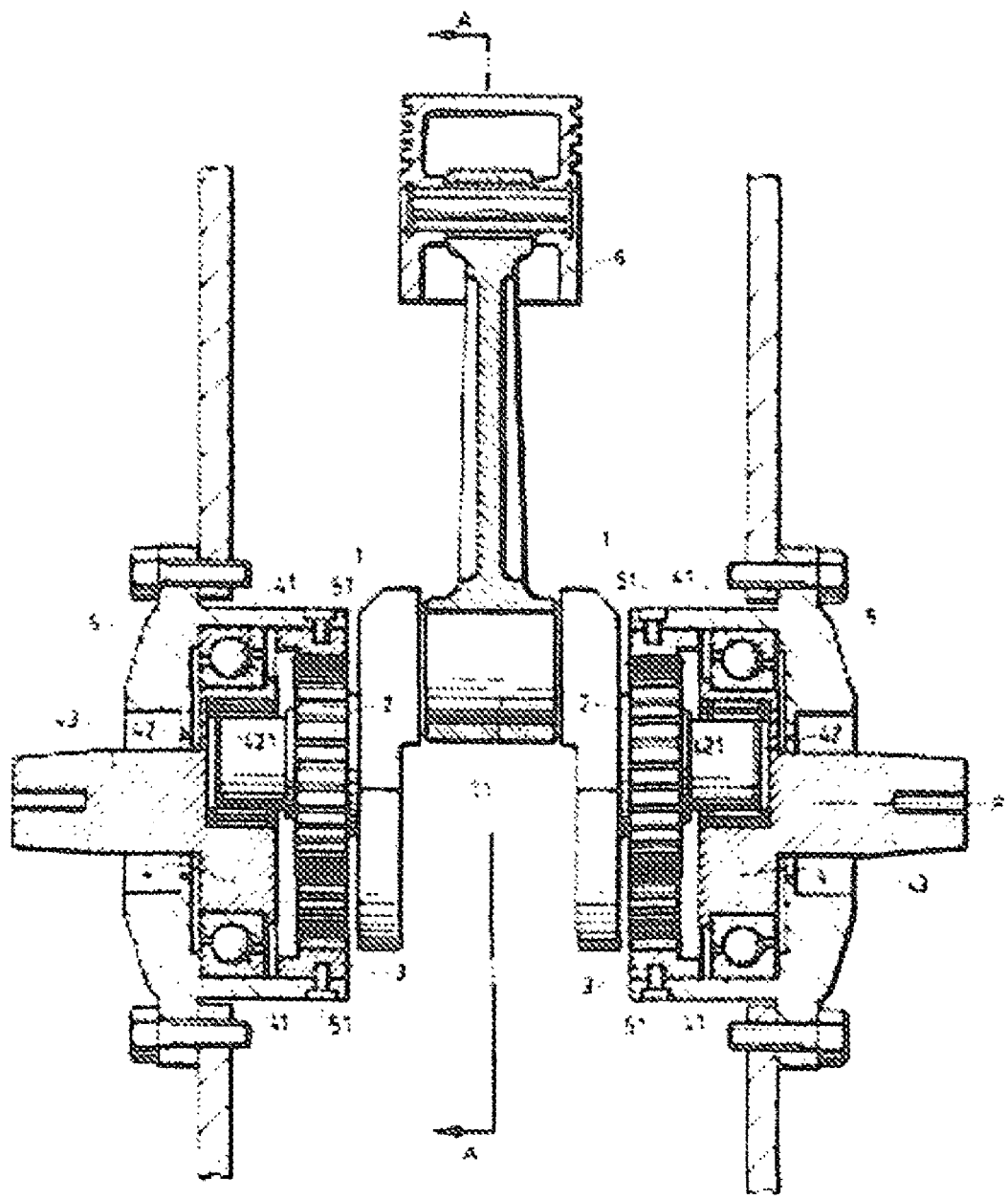
FIG. 21 and FIG. 22 are schematic views respectively illustrating the structure and operation of the engine disclosed in Taiwan Pat. No. 62305.
Figure 22:
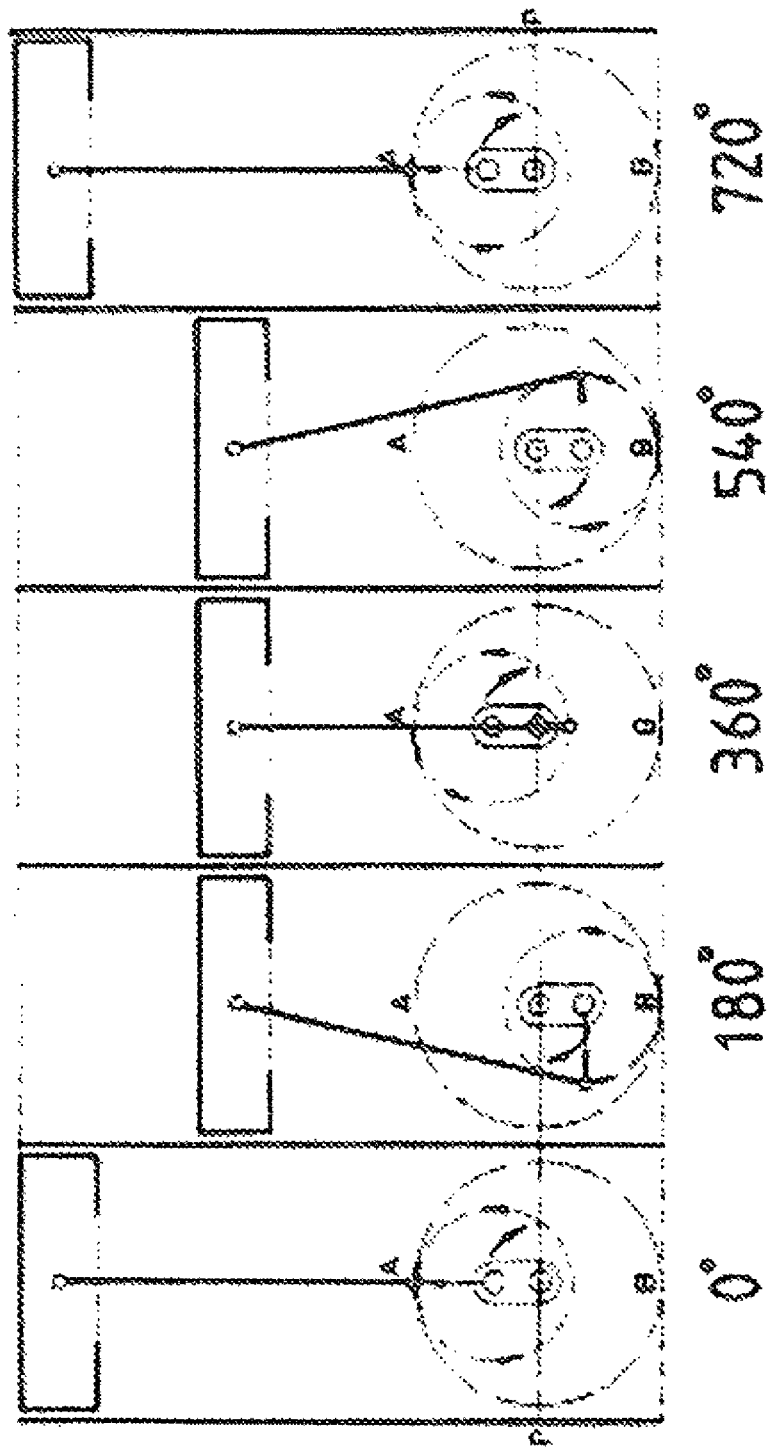

Referring to FIG. 15 and FIG. 16, the number of cylinders together with the pistons 7 and link 6 is disposed in multiple of three or six. In the latter case, the rest of the two sets are each settled at two ends of the case 1 facing to each other by turning 180° (see FIG. 16). With this scheme, by allowing the two opposite cylinders to carry out the same stroke simultaneously so as to balance the operation and double the force to drive the movable gear wheel 3. Referring to FIG. 17, in the case of nine-cylinder scheme, three cylinders in one set can be disposed in one direction in parallel and allow each set of the cylinders 120° apart one another to perform a stroke sequentially so as to generate three times of the overall driving torque compared to the conventional one.

Although the present invention has been disclosed and illustrated with respect to the preferred embodiments thereof, it is to be understood that the invention is not to be so limited and that other changes and modifications can be made within the full intended scope of the invention as hereinafter claimed.

What is claimed is:

1. A kinetic energy generation device comprising:
a case;
a fixation gear wheel disposed at an interior rim of said case;
a movable gear wheel engaged with said fixation gear wheel;
a motion transmission member rotatably installed in said case;
a motion transmission shaft provided at the axis of said motion transmission member;
an axis gear wheel disposed in relation to said movable gear wheel so as to engage with said motion transmission shaft;
a flywheel provided external to said axis gear wheel and being engaged therewith a force applying shaft attached to an end thereof; and
several links each being connected to said force applying shaft with its one end and to a piston of a cylinder with the other end thereof;
wherein the gear ratio of said fixation gear wheel to said movable gear wheel is 3:2, and the gear ratio of said motion transmission shaft to said axis gear wheel is also 3:2.

2. The device of claim 1, wherein the number of said cylinder is a multiple of 3, each set containing 3 cylinders is disposed 120° apart from one another.

3. The device of claim 1, wherein the number of said cylinders is a multiple of 6, each set containing 3 cylinder is disposed 120° apart from one another, and rest of the two sets are each settled at two ends of said case facing to each other by turning 180°.

4. The device of claim 1, a ball bearing is provided between the contact surface of said motion transmission member and said case.

5. The device of claim 1, wherein the height of said force applying shaft can be adjusted according to the actual need whether it is to be used for an engine or an air compressor.

6. The device of claim 1, wherein said axis gear wheel is pre-shifted an angle when said piston is at the initiation of the stroke.

7. The device of claim 1, wherein a follower gear wheel is interposed in a dummy area between said motion transmission shaft and said fixation gear wheel.

8. The device of claim 1, wherein said motion transmission shaft may be driven by another prime mover to rotate, the power is then transmitted to said piston via said axis gear wheel, said movable gear wheel, said flywheel, said force applying shaft and said link to compress said cylinder to store energy thereby working as an air compressor.

* * * * *